United States Patent
Lian et al.

(10) Patent No.: US 12,218,613 B2
(45) Date of Patent: *Feb. 4, 2025

(54) ELECTRIC MOTOR DRIVING APPARATUS, CONTROL METHOD, VEHICLE, AND READABLE STORAGE MEDIUM

(71) Applicant: BYD COMPANY LIMITED, Guangdong (CN)

(72) Inventors: Yubo Lian, Shenzhen (CN); Heping Ling, Shenzhen (CN); Hua Pan, Shenzhen (CN); Feiyue Xie, Shenzhen (CN); Lijun Zhang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/606,204

(22) Filed: Mar. 15, 2024

(65) Prior Publication Data

US 2024/0223118 A1 Jul. 4, 2024

Related U.S. Application Data

(63) Continuation of application No. 17/416,853, filed as application No. PCT/CN2019/125979 on Dec. 17, 2019, now Pat. No. 11,990,853.

(30) Foreign Application Priority Data

Dec. 21, 2018 (CN) .......................... 201811574157.X

(51) Int. Cl.
*H02P 27/08* (2006.01)
*H02J 7/00* (2006.01)
*H02P 29/62* (2016.01)

(52) U.S. Cl.
CPC .......... *H02P 27/085* (2013.01); *H02J 7/0063* (2013.01); *H02P 29/62* (2016.02); *H02J 2207/20* (2020.01)

(58) Field of Classification Search
CPC ...... H02P 27/085; H02P 29/62; H02J 7/0063; H02J 2207/20

(Continued)

(56) References Cited

U.S. PATENT DOCUMENTS

| | | | | |
|---|---|---|---|---|
| 6,066,928 A | * | 5/2000 | Kinoshita | B60L 50/40 180/65.8 |
| 6,515,878 B1 | * | 2/2003 | Meins | H02J 50/12 191/10 |

(Continued)

FOREIGN PATENT DOCUMENTS

| | | |
|---|---|---|
| CN | 103419656 A | 12/2013 |
| CN | 103931093 A | 7/2014 |

(Continued)

OTHER PUBLICATIONS

International Search Report and Written Opinion for Application No. PCT/CN2019/125979, mailed on Mar. 23, 2020, 9 pages.

*Primary Examiner* — Kawing Chan

(57) ABSTRACT

A motor drive apparatus includes a three-phase inverter and a three-phase motor. A first terminal of the three-phase inverter is connected to a positive electrode of a power battery. A second terminal of the three-phase inverter is connected to a negative electrode of the power battery Three phase coils of the three-phase motor are respectively connected to midpoints of three phase legs of the three-phase inverter. The motor drive apparatus is configured to simultaneously control (i) a process of charging the power battery by a power supply module, (ii) a torque of the three-phase motor at a zero output, and (iii) the three-phase inverter and (Continued)

the three-phase motor to heat a heat exchange medium flowing through at least one of the three-phase inverter or the three-phase motor.

20 Claims, 7 Drawing Sheets

(58) Field of Classification Search
USPC .......................................................... 318/504
See application file for complete search history.

(56) References Cited

U.S. PATENT DOCUMENTS

| | | | | |
|---|---|---|---|---|
| 8,912,738 | B2 * | 12/2014 | Mahlein | ................ B60L 53/122 363/34 |
| 10,104,834 | B2 * | 10/2018 | Yuki | ....................... A01D 34/78 |
| 10,771,001 | B2 * | 9/2020 | Smolenaers | ............ H02P 25/22 |
| 11,165,275 | B2 * | 11/2021 | Lee | ......................... H02J 7/342 |
| 2005/0105311 | A1 * | 5/2005 | Soldano | .............. H02M 1/0085 363/89 |
| 2012/0019174 | A1 | 1/2012 | Doganata et al. | |
| 2017/0354088 | A1 | 12/2017 | Yuki et al. | |
| 2018/0254732 | A1 | 9/2018 | Smolenaers | |

FOREIGN PATENT DOCUMENTS

| | | | |
|---|---|---|---|
| CN | 107276415 A | 10/2017 | |
| CN | 107592954 A | 1/2018 | |
| CN | 108475937 A | 8/2018 | |
| CN | 108539833 A | 9/2018 | |
| EP | 834977 A2 * | 4/1998 | .............. B60L 53/20 |
| FR | 2937803 A3 | 4/2010 | |
| FR | 3014611 A1 * | 6/2015 | .......... B60L 11/1814 |
| JP | 2009-224256 A | 10/2009 | |
| JP | 2014-230434 A | 12/2014 | |
| JP | 2015-233355 A | 12/2015 | |
| JP | 2017-011993 A | 1/2017 | |
| JP | 2019-071772 A | 5/2019 | |
| WO | 2013/174271 A1 | 11/2013 | |

* cited by examiner

Charging      Heating      Charging + heating

Charging-dominant      Heating-dominant      Charging + heating

ELECTRIC MOTOR DRIVING APPARATUS, CONTROL METHOD, VEHICLE, AND READABLE STORAGE MEDIUM

CROSS-REFERENCE TO RELATED APPLICATIONS

This application is a continuation application of U.S. patent application Ser. No. 17/416,853 filed Jun. 21, 2021, which is a National Phase Application of International Patent Application No. PCT/CN2019/125979 filed on Dec. 17, 2019, which is based on and claims priority to and benefits of Chinese Patent Application No. 201811574157.X filed on Dec. 21, 2018. The entire content of all of the above identified applications is incorporated herein by reference.

FIELD

The present disclosure relates to the field of motor drive technologies, and in particular, to a motor drive apparatus, a method for controlling the same, a vehicle, and a readable storage medium.

BACKGROUND

Currently, energy crises and environmental pollution problems are becoming increasingly severe. As a new type of transportation tool, an electric vehicle can achieve "zero emission". In addition, the electric vehicle has advantages such as a simple structure, high energy efficiency, and low noise, and therefore, the electric vehicle will occupy a dominant position in future development of automobiles. A new energy vehicle mounted with a direct current circuit can obtain electric energy through a direct current power supply circuit to drive a three-phase motor to output torque. In consideration of a vehicle driving in a low-temperature condition, the vehicle further needs to have a heating function, that is, to heat a low-temperature device inside the vehicle. In addition, when charge of a power battery is lower, the power battery needs to be charged as well. Currently, a torque output process of the three-phase motor, a heating process of the device inside the vehicle, and a charging process of the power battery are all controlled separately, resulting in a complex overall control policy inside the vehicle.

SUMMARY

An objective of the present disclosure is to provide a motor drive apparatus, a method for controlling the same, a vehicle, and a readable storage medium, to simultaneously control a charging process of a power battery, a torque output process of a three-phase motor, and a heating process of devices inside the vehicle.

The present disclosure is implemented as follows: According to a first aspect of the present disclosure, a motor drive apparatus is provided, including: a three-phase inverter, a three-phase motor, and a buck side capacitor connected in sequence, where the buck side capacitor is connected to a positive electrode and a negative electrode of a power supply module, a first terminal of the three-phase inverter is connected to a positive electrode of a power battery, a second terminal of the three-phase inverter is connected to a negative electrode of the power battery, a first terminal of the buck side capacitor is connected to a connection point of three phase coils of the three-phase motor, a second terminal of the buck side capacitor is connected to the second terminal of the three-phase inverter, and the three phase coils of the three-phase motor are respectively connected to midpoints of three phase legs of the three-phase inverter.

According to a second aspect of the present disclosure, a method for controlling the motor drive apparatus according to the first aspect is provided, where the method for controlling the motor drive apparatus includes:
  obtaining a required heating power and a required charging power; and
  adjusting a current value and direction of each phase current of the three-phase motor based on the required heating power, the required charging power, and an output of the motor at a zero torque, to simultaneously control a process of charging the power battery by the power supply, a torque of the three-phase motor at a zero output, and the three-phase inverter and the three-phase motor to heat a heat exchange medium flowing through at least one of the three-phase inverter or the three-phase motor.

According to a third aspect of the present disclosure, a method for controlling the motor drive apparatus according to the first aspect is provided, where the method for controlling the motor drive apparatus includes:
  obtaining a required heating power and a required charging power;
  obtaining a target input current of the three-phase motor and a first target duty cycle of a control pulse of each phase leg based on the required heating power, the required charging power, and an output of the motor at a zero torque; and
  receiving an input current of the power supply module based on the target input current, and controlling each phase leg based on the first target duty cycle, to simultaneously control a process of charging the power battery by the power supply module, a torque of the three-phase motor at a zero output, and the three-phase inverter and the three-phase motor to heat a heat exchange medium flowing through at least one of the three-phase inverter or the three-phase motor.

According to a fourth aspect of the present disclosure, a motor drive apparatus is provided, based on the motor drive apparatus according to the first aspect, where the motor drive apparatus further includes:
  a data obtaining module, configured to obtain a required heating power and a required charging power; and
  a control module, configured to adjust a current value and direction of each phase current of the three-phase motor based on the required heating power, the required charging power, and an output of the motor at a zero torque, to simultaneously control a process of charging the power battery by the power supply module, a torque of the three-phase motor at a zero output, and the three-phase inverter and the three-phase motor to heat a heat exchange medium flowing through at least one of the three-phase inverter or the three-phase motor.

According to a fifth aspect of the present disclosure, a motor drive apparatus is provided, based on the motor drive apparatus according to the first aspect, where the motor drive apparatus further includes:
  a data obtaining module, configured to obtain a required heating power and a required charging power;
  a target duty cycle obtaining module, configured to obtain a target input current of the three-phase motor and a first target duty cycle of a control pulse of each phase leg based on the required heating power, the required charging power, and an output of the motor at a zero torque; and a pulse width modulation (PWM) control module, configured to receive an input current of the power supply module based on the target input current, and control each phase leg based on the first target duty cycle, to simultaneously control a process of charging the power battery by the power supply module, a torque of the three-phase motor at a zero output, and the three-phase inverter and the three-phase motor to heat a heat exchange medium flowing through at least one of the three-phase inverter or the three-phase motor.

According to a sixth aspect of the present disclosure, a vehicle is provided, including a memory and a processor, where the processor is configured to read an executable program code stored in the memory to run a program corresponding to the executable program code, to implement the control method according to the second aspect or the third aspect.

According to a seventh aspect of the present disclosure, a non-transitory computer-readable storage medium is provided, storing a computer program thereon, where when the program is executed by a processor, the control method according to the second aspect or the third aspect is implemented.

In the technical solutions of the present disclosure, a motor drive apparatus, a method for controlling the same, a vehicle, and a readable storage medium are provided. The method for controlling the motor drive apparatus includes: obtaining a required heating power and a required charging power; obtaining a target input current of a three-phase motor and a first target duty cycle of a control pulse of each phase leg based on the required heating power, the required charging power, and an output of the motor at a zero torque; and receiving an input current of a power supply module based on the target input current, and controlling each phase leg based on the first target duty cycle, to simultaneously control a process of charging a power battery by the power supply module, a torque of the three-phase motor at a zero output, and a three-phase inverter and the three-phase motor to heat a heat exchange medium flowing through at least one of the three-phase inverter or the three-phase motor. In the technical solutions of the present disclosure, a coordinated control method of the zero torque output, charging of the power battery, and heating of the power battery is implemented without adding an extra boost charging module and a heating module. In this way, a coordinated operation problem of a required zero torque output, and battery charging and heating functions of a vehicle that is not provided with a complete direct current power supply circuit is effectively resolved. The heating function may be used to heat not only the power battery, but also a passenger compartment, which brings benefits such as a simple circuit structure, low costs, and a low risk of failures.

BRIEF DESCRIPTION OF THE DRAWINGS

To describe the technical solutions of the embodiments of the present disclosure more clearly, the following briefly introduces the accompanying drawings required for describing the embodiments or the existing technology. Apparently, the accompanying drawings in the following description show only some embodiments of the present disclosure, and a person of ordinary skill in the art may still derive other accompanying drawings from these accompanying drawings without creative efforts.

DETAILED DESCRIPTION

To make the objectives, technical solutions, and advantages of the present disclosure clearer and more understandable, the present disclosure is further described in detail below with reference to the accompanying drawings and the embodiments. It should be understood that the specific embodiments described herein are merely used for describing the present disclosure, but are not intended to limit the present disclosure.

To describe technical solutions in the present disclosure, the following will be described by using specific embodiments.

Figure 1:
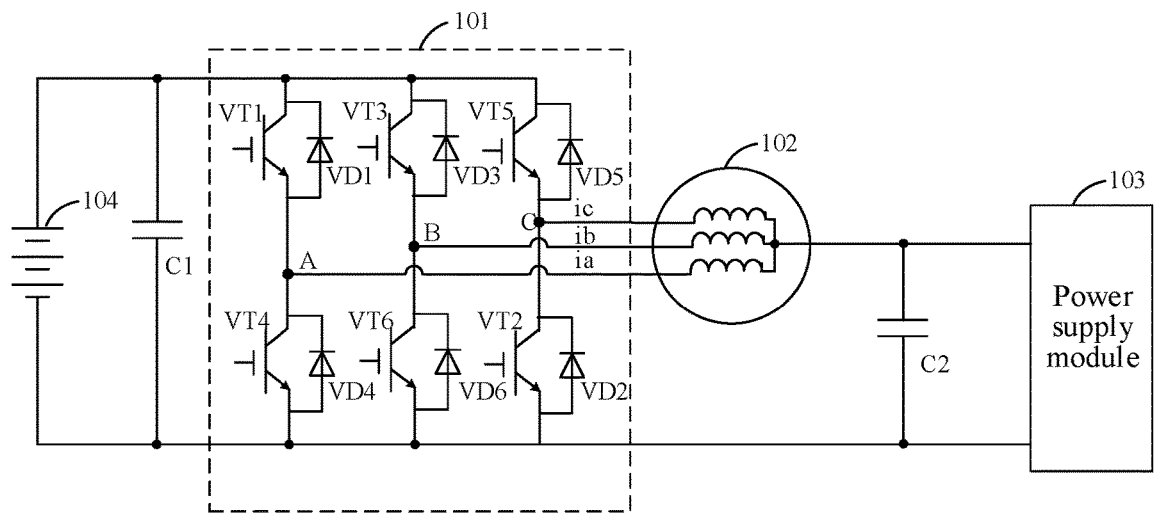
FIG. 1 is a circuit diagram of a motor drive apparatus according to Embodiment 1 of the present disclosure.

Embodiment 1 of the present disclosure provides a motor drive apparatus. As shown in FIG. 1, the motor drive apparatus includes: a three-phase inverter 101, a three-phase motor 102, and a buck side capacitor C2 connected in sequence where the buck side capacitor C2 is connected to a positive electrode and a negative electrode of a power supply module 103, a first terminal of the three-phase inverter 101 is connected to a positive electrode of a power battery 104, a second terminal of the three-phase inverter 101 is connected to a negative electrode of the power battery 104, a first terminal of the buck side capacitor C2 is connected to a connection point of three phase coils of the three-phase motor 102, a second terminal of the buck side capacitor C2 is connected to the second terminal of the three-phase inverter 101, and the three phase coils of the three-phase motor 102 are respectively connected to midpoints of three phase legs of the three-phase inverter 101.

For the three-phase inverter 101, specifically, the three-phase inverter 101 includes a first power switch unit, a second power switch unit, a third power switch unit, a fourth power switch unit, a fifth power switch unit, and a sixth power switch unit. Input terminals of the first power switch unit, the third power switch unit, and the fifth power switch unit are jointly connected to form the first terminal of the three-phase inverter 101, output terminals of the second power switch unit, the fourth power switch unit, and the sixth power switch unit are jointly connected to form the second terminal of the three-phase inverter 101. A first-phase coil of the three-phase motor 102 is connected to an output terminal of the first power switch unit and an input terminal of the fourth power switch unit. A second-phase coil of the three-phase motor 102 is connected to an output terminal of the third power switch unit and an input terminal of the sixth power switch unit. A third-phase coil of the three-phase motor 102 is connected to an output terminal of the fifth power switch unit and an input terminal of the second power switch unit.

The first power switch unit in the three-phase inverter 101 includes a first upper leg VT1 and a first upper diode VD1, the second power switch unit includes a second lower leg VT2 and a second lower diode VD2, the third power switch unit includes a third upper leg VT3 and a third upper diode VD3, the fourth power switch unit includes a fourth lower leg VT4 and a fourth lower diode VD4, the fifth power switch unit includes a fifth upper leg VT5 and a fifth upper diode VD5, and the sixth power switch unit includes a sixth lower leg VT6 and a sixth lower diode VD6. The three-phase motor 102 is a three-phase four-wire system, and may be a permanent magnet synchronous motor or asynchronous motor. A neutral wire extends from a connection midpoint of the three phase coils, and the neutral wire is connected to the power supply module 103. The three phase coils of the motor are respectively connected to a midpoint between A-phase, B-phase, and C-phase upper and lower legs in the three-phase inverter 101.

The power supply module 103 may provide power forms such as a direct current provided by a direct current charging pile, a direct current outputted after rectification of a single-phase or three-phase alternating current charging pile, electric energy generated by a fuel battery, or a direct current obtained after a controller of a generator rectifies electricity generated by the generator driven by rotation of a range extender such as a motor.

In this embodiment of the present disclosure, a connection structure of the power battery, the three-phase inverter, the three-phase motor, and the power supply module is provided, the connection point of the three phase coils of the three-phase motor is used to connect the power supply module, to receive a current inputted by the power supply module. When a motor drive apparatus needs to be heated and charged, a required heating power, a required charging power, and an output of the motor at a zero torque are obtained; and the three phase legs of the three-phase inverter are controlled based on the required heating power, the required charging power and the output of the motor at a zero torque, so that a heating process, a charging process, and an output process of the motor at a zero torque are simultaneously performed.

Figure 2:
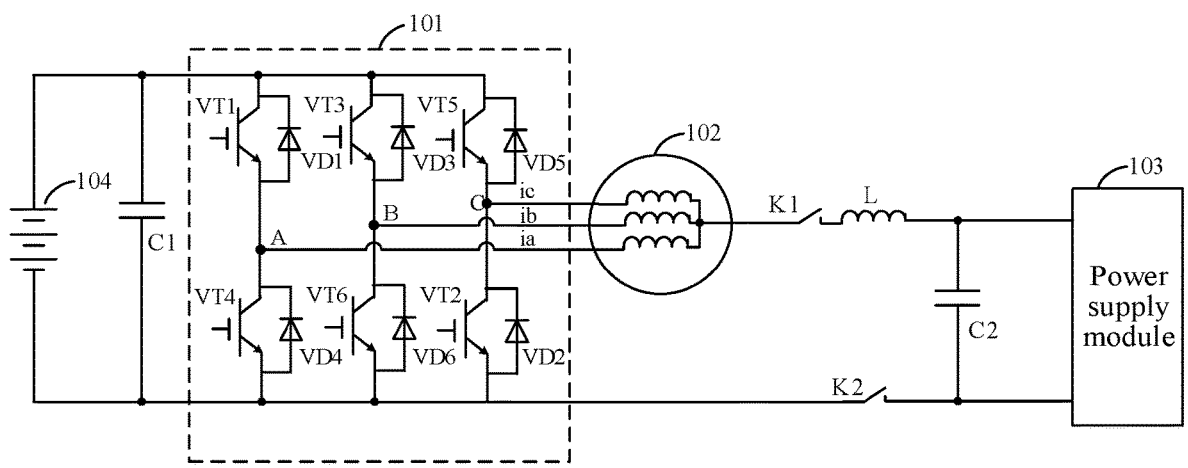
FIG. 2 is another circuit diagram of a motor drive apparatus according to Embodiment 1 of the present disclosure.

Further, as shown in FIG. 2, the motor drive apparatus further includes an inductor L, a switch K1, and a switch K2, where a first terminal of the switch K1 is connected to the connection point of the three phase coils of the three-phase motor 102, a second terminal of the switch K1 is connected to a first terminal of the inductor L, a second terminal of the inductor L is connected to the first terminal of the buck side capacitor C2, the second terminal of the buck side capacitor C2 is connected to a first terminal of the switch K2, and a second terminal of the switch K2 is connected to the second terminal of the three-phase converter 101.

The inductor L is configured for filtering and energy storage, and the switch K1 and the switch K2 are configured to control connection and disconnection of the power supply module 103.

Figure 3:
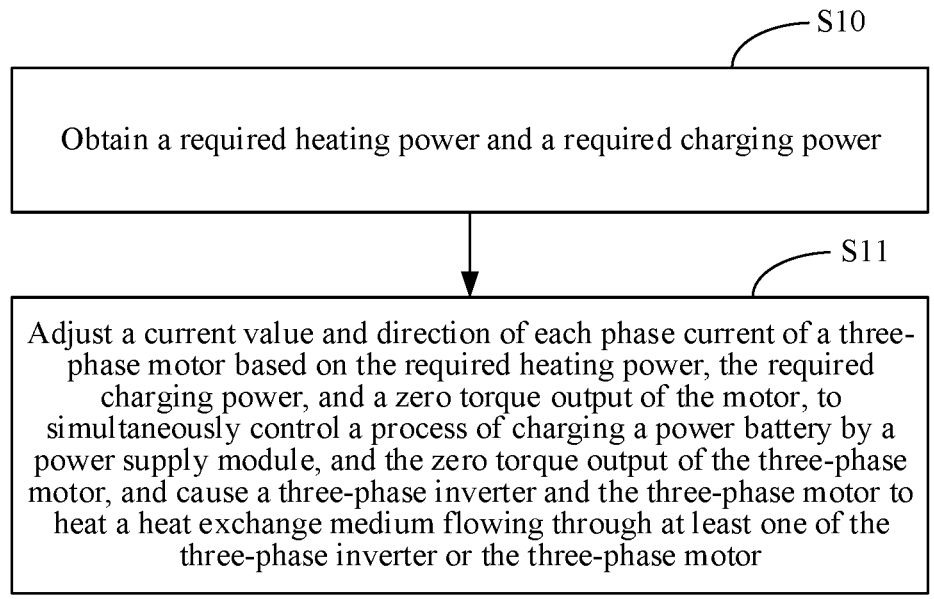
FIG. 3 is a flowchart of a method for controlling a motor drive apparatus according to Embodiment 2 of the present disclosure.

Embodiment 2 of the present disclosure provides a method for controlling the motor drive apparatus according to Embodiment 1. As shown in FIG. 3, the method for controlling the motor drive apparatus includes the following steps.

Step S10: Obtain a required heating power and a required charging power.

In step S10, the required heating power may be a heating power obtained by detecting a temperature of a to-be-heated component by a controller of an entire vehicle, and the to-be-heated component may be a rechargeable battery. The required charging power is a charging power obtained by the controller of the entire vehicle based on a current state of charge of the power battery. In this case, the vehicle is in a non-driven state, and an output value of a torque of the motor is zero.

Step S11: Adjust a current value and direction of each phase current of the three-phase motor based on the required heating power, the required charging power, and an output of the motor at a zero torque, to simultaneously control a process of charging the power battery by the power supply module, a torque of the three-phase motor at a zero output, and the three-phase inverter and the three-phase motor to heat a heat exchange medium flowing through at least one of the three-phase inverter or the three-phase motor.

In step S11, a current direction of each phase current refers to a direction of flowing into or out of the three phase coils, and a current value of each phase current refers to a value of a current flowing into or out of the three phase coils, for example, flowing into the three-phase motor from a coil connected to an A-phase leg in the three-phase inverter, and flowing out of the three-phase motor from coils connected to B-phase and C-phase legs in the three-phase inverter. Because the required heating power and the zero torque output may be adjusted by adjusting the current value of each phase current of the three-phase motor, and a sum of current values of all phase currents of the three-phase motor is equal to an input current at the connection point of the three phase coils of the three-phase motor, the input current may be used to adjust the charging power. The current value and direction of each phase current of the three-phase motor are adjusted, to simultaneously control a process of charging the power battery by the power supply module, the torque of the three-phase motor at a zero output, and the three-phase inverter and the three-phase motor to heat a heat exchange medium flowing through at least one of the three-phase inverter or the three-phase motor.

In the present disclosure, based on the required heating power, the required charging power, and the output of the motor at a zero torque, the current value and direction of each phase current of the three-phase motor are adjusted to implement a coordinated control method of the zero torque output, charging of the power battery, and heating of the power battery without adding an extra boost charging module and a heating module. In this way, a coordinated operation problem of a required torque output, and battery charging and heating functions of a vehicle that is not provided with a complete direct current power supply circuit is effectively resolved, and the heating function may be used to heat not only the power battery, but also a passenger compartment, which brings benefits such as a simple circuit structure, low costs, and a low risk of failures.

Figure 4:
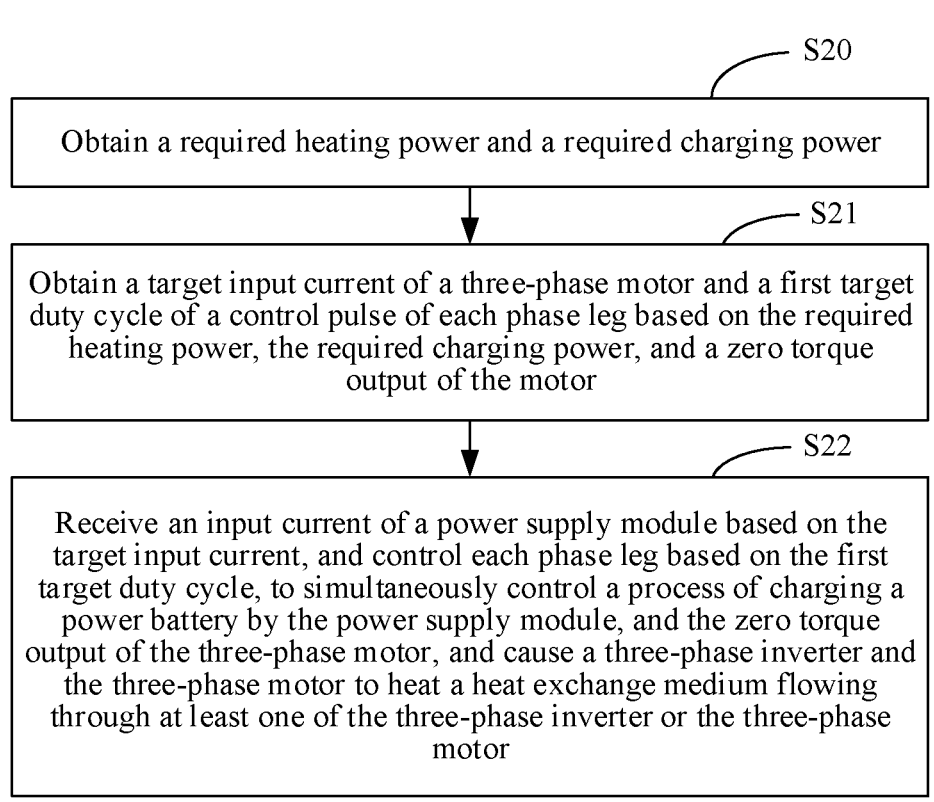
FIG. 4 is a flowchart of a method for controlling a motor drive apparatus according to Embodiment 3 of the present disclosure.

Embodiment 3 of the present disclosure provides a method for controlling the motor drive apparatus according to Embodiment 1. As shown in FIG. 4, the method for controlling the motor drive apparatus includes the following steps.

Step S20: Obtain a required heating power and a required charging power.

Step S21: Obtain a target input current of the three-phase motor and a first target duty cycle of a control pulse of each phase leg based on the required heating power, the required charging power, and an output of the motor at a zero torque.

Step S22: Receive an input current of the power supply module based on the target input current, and control each phase leg based on the first target duty cycle, to simultaneously control a process of charging the power battery by the power supply module, the torque of the three-phase motor at a zero output, and the three-phase inverter and the three-phase motor to heat a heat exchange medium flowing through at least one of the three-phase inverter or the three-phase motor.

For step S20, since step S20 is the same as step S10, details are not described herein again.

For step S21, the target input current of the three-phase motor refers to a current outputted by the power supply module to the three-phase motor, and the first target duty cycle of the control pulse of each phase leg refers to a duty cycle of a pulse width modulation (PWM) signal that is outputted to each phase leg and that is used to control on and off of the power switch unit on each phase leg. The target input current of the three-phase motor is calculated and obtained based on the required heating power, the required charging power, and the output of the motor at a zero torque. Then the first target duty cycle of the control pulse of each phase leg is calculated based on the target input current.

Figure 5:
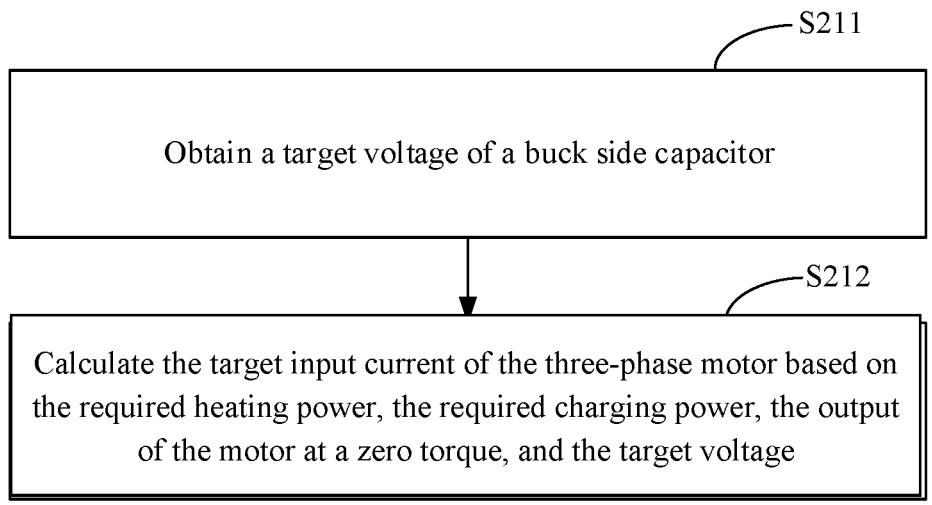
FIG. 5 is a flowchart of step S21 in a method for controlling a motor drive apparatus according to Embodiment 3 of the present disclosure.

In an implementation, as shown in FIG. 5, step S21 includes:

Step S211: Obtain a target voltage of a buck side capacitor.

In step S211, an existing voltage of the power battery is obtained, the power supply module is communicated with the power battery to obtain a highest output voltage of the power supply module. A target voltage of the buck side capacitor is determined based on the existing voltage of the power battery and the highest output voltage of the power supply module. The target voltage of the buck side capacitor meets the following three points: 1. The target voltage of the buck side capacitor is less than the highest output voltage of the power supply module. 2. The target voltage of the buck side capacitor is less than the existing voltage of the power battery. 3. The target voltage of the buck side capacitor should be selected as large as possible, but the foregoing requirements 1 and 2 should be met, and a specific voltage margin should be retained. Therefore, the target voltage of the buck side capacitor may be a smaller one of the existing voltage of the power battery and a highest output voltage of a charging pile.

An interaction process of the control module and the power supply module of the vehicle is as follows.

Step 1: A battery management system (BMS) in the control module obtains a highest output voltage of the power supply module through a packet.

Step 2: Based on the highest output voltage of the power supply module and an existing voltage of the power battery, the BMS obtains a target voltage value of the buck side capacitor with a specific retained margin, and sends the target voltage value to the control module.

Step 3: A motor controller in the control module controls an average duty cycle of three phases based on the target voltage of the buck side capacitor, so that the voltage of the buck side capacitor reaches the target voltage value.

Step 4: The BMS informs an external power supply module of the voltage value on the vehicle end (that is, the voltage value on the buck side) through a packet.

Step 5: The external power supply module detects the voltage value on the buck side, compares the voltage value on the buck side with the voltage value received in the packet, and starts charging after a difference thereof meets a preset standard.

Step S212: Calculate the target input current of the three-phase motor based on the required heating power, the required charging power, the output of the motor at a zero torque, and the target voltage.

In step S212, based on a formula $$I = \frac{(P + P_2)}{U_2},$$

the target input current is calculated, P is the required heating power, $P_2$ is the required charging power, and $U_2$ is the target voltage of the buck side capacitor.

Figure 6:
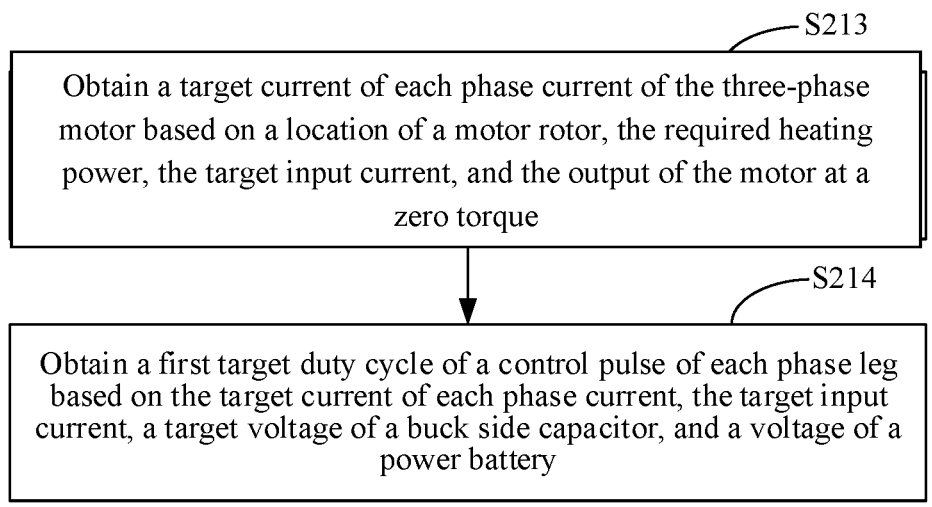
FIG. 6 is another flowchart of step S21 in a method for controlling a motor drive apparatus according to Embodiment 3 of the present disclosure.

Further, as shown in FIG. 6, step S21 further includes:

Step S213: Obtain a target current of each phase current of the three-phase motor based on a location of a motor rotor, the required heating power, the target input current, and the output of the motor at a zero torque.

Step S213 includes:
calculating a target current of each phase current of the three-phase motor based on the location of the motor rotor, the required heating power, the target input current, and the output of the motor at a zero torque by using the following formula 1, formula 2, and formula 3:

$$T_e = \frac{3}{2} * p * \left[ \lambda + (L_d - L_q) * \frac{2}{3} * \right. \qquad \text{Formula 1}$$

$$[\sin\alpha * IA + \sin(\alpha - 120) * IB + \sin(\alpha + 120) * IC] ] *$$

$$\frac{2}{3} * (\cos\alpha * IA + \cos(\alpha - 120) * IB + \cos(\alpha + 120) * IC)$$

$$IA + IB + IC = I \qquad \text{Formula 2}$$

$$P = (IA \times IA + IB \times IB + IC \times IC) \times R \qquad \text{Formula 3}$$

where a is a lag angle of the rotor, IA, IB, and IC are respectively target currents of phase currents of the three-phase motor, I is the target input current, Te is the output of the motor at a zero torque, $\lambda$, $\rho$, $L_d$, $L_q$ are motor parameters, P is the required heating power, and R is an equivalent impedance of the three-phase motor.

Step S214: Obtain a first target duty cycle of a control pulse of each phase leg based on the target current of each phase current, the target input current, the target voltage of the buck side capacitor, and a voltage of the power battery.

Step S214 includes:

Step S2141: Obtain an average duty cycle of control pulses of three phase currents based on the target voltage of the buck side capacitor, the target input current, and the voltage of the power battery.

Step S2141 includes:

obtaining the average duty cycle of the control pulses of the three phase currents based on the target voltage of the buck side capacitor, the target input current, and the voltage of the power battery by using the following formula:

Formula 4: $U_2 = U_1 \times D_0 - I \times R$, where $U_2$ is the target voltage of the buck side capacitor, $U_1$ is the voltage of the power battery, $D_0$ is the average duty cycle of the control pulses of the three phase currents, I is the target input current, and R is the equivalent impedance of the three-phase motor.

Herein, $U_1 \times D_0$ is a voltage between two ends of the three-phase inverter, and $I \times R$ is a voltage drop on the three-phase motor. The foregoing formula may be obtained based on a condition that the voltage between the two ends of the three-phase inverter is equal to a sum of the voltage drop on the three-phase motor and the target voltage of the buck side capacitor.

Step S2142: Obtain the first target duty cycle of the control pulse of each phase leg based on the average duty cycle, the target input current, the target current of each phase current, the target voltage of the buck side capacitor, and the voltage of the power battery.

Step S2142 includes:

obtaining the first target duty cycle of the control pulse of each phase leg based on the average duty cycle, the target input current, the target current of each phase current, and the voltage of the power battery by using the following formula.

$$D_1 = D_0 - \frac{IR - I_1 \times R_1}{U_1} \quad \text{Formula 5}$$

where $I_1$ is the target current of each phase current, $R_1$ is an equivalent impedance of each phase coil, and $D_1$ is the first target duty cycle of the control pulse of each phase leg.

Because the voltage between each phase leg and a connection point of each phase coil is equal to a sum of the voltage drop on the phase coil and the target voltage of the buck side capacitor, that is $U_1 \times D_1 = R_1 \times I_1 + U_2$. With reference to the foregoing formula 4, a formula 5 may be obtained. That is, the first target duty cycle of the control pulse of each phase leg may be obtained.

In the circuit diagram shown in FIG. 2, the motor drive apparatus further includes an inductor.

In step S2141, the obtaining an average duty cycle of control pulses of three phase currents based on the target voltage of the buck side capacitor, the target input current, and the voltage of the power battery includes:

obtaining the average duty cycle of the control pulses of the three phase currents based on the target voltage of the buck side capacitor, the target input current, and the voltage of the power battery by using the following formula:

$U_2 = U_1 \times D_0 - I \times R - I \times R_L$, where $U_2$ is the target voltage of the buck side capacitor, $U_1$ is the voltage of the power battery, $D_0$ is the average duty cycle of the control pulses of the three phase currents, I is the target input current, R is the equivalent impedance of the three-phase motor, and $R_L$ is an impedance of the inductor.

Because an inductor is provided, and there is an impedance of the inductor on the inductor, the formula further includes the voltage drop on the inductor.

In step S2142, the first target duty cycle of the control pulse of each phase leg is obtained based on the average duty cycle, the target input current, the target current of each phase current, and the voltage of the power battery by using the following formula:

$$D_1 = D_0 - \frac{IR - I_1 \times R_1}{U_1}$$

where $I_1$ is the target current of each phase current, $R_1$ is an equivalent impedance of each phase coil, and $D_1$ is the first target duty cycle of the control pulse of each phase leg.

In this embodiment, the target input current of the three-phase motor is calculated based on the required heating power, the required charging power, and the output of the motor at a zero torque; the target current of each phase current of the three-phase motor is further obtained based on a location of a motor rotor, the required heating power, the target input current, and the output of the motor at a zero torque; the first target duty cycle of the control pulse of each phase leg is further calculated based on the target input current and the target current of each phase current of the three-phase motor; and the three-phase leg is controlled based on the first target duty cycle to implement a coordinated control method of the zero torque output, charging of the power battery, and heating of the power battery without adding an extra boost charging module and a heating module. In this way, a coordinated operation problem of a required torque output, and battery charging and heating functions of a vehicle that is not provided with a complete direct current power supply circuit is effectively resolved. The heating function may be used to heat not only the power battery, but also a passenger compartment, which brings benefits such as a simple circuit structure, low costs, and a low risk of failures.

Figure 7:
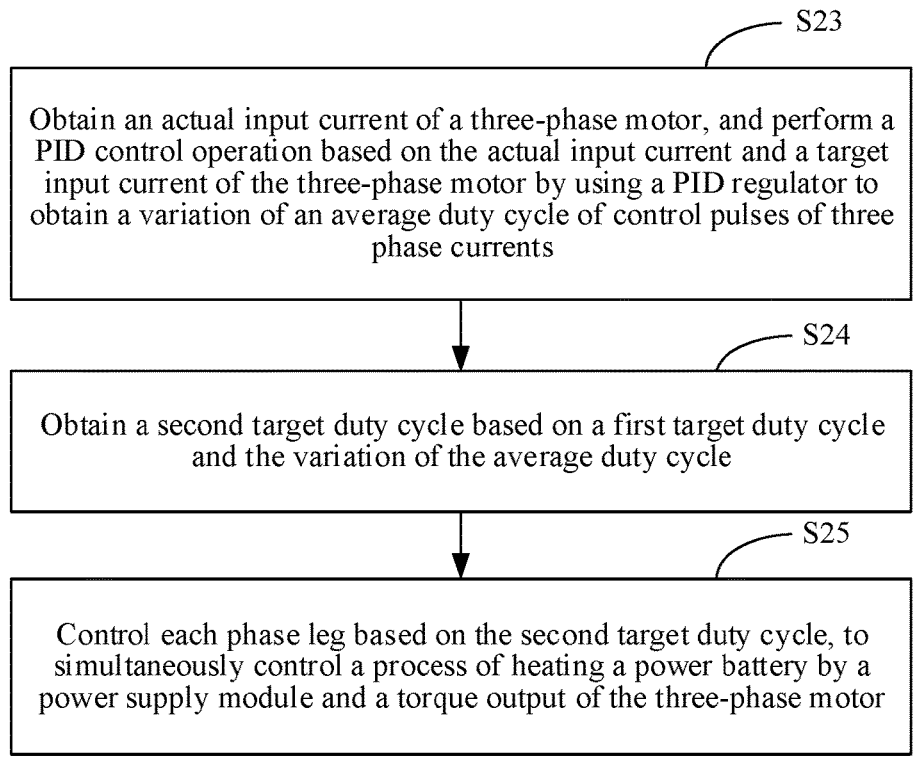
FIG. 7 is a flowchart of steps following step S22 in a method for controlling a motor drive apparatus according to Embodiment 3 of the present disclosure.

Further, as shown in FIG. 7, in step S22, after the controlling each phase leg based on the first target duty cycle, the method further includes following steps.

Step S23: Obtain an actual input current of the three-phase motor, and perform a PID control operation based on the actual input current and the target input current of the three-phase motor by using a PID regulator to obtain a variation of the average duty cycle of the control pulses of the three phase currents.

Step S24: Obtain a second target duty cycle based on the first target duty cycle and the variation of the average duty cycle.

Step S25: Control each phase leg based on the second target duty cycle, to simultaneously control the process of heating the power battery by the power supply module and the torque output of the three-phase motor.

In step S23, the PID regulator for PID control (proportional-integral-derivative control) is a common feedback loop component in industrial control applications, and includes a proportional unit P, an integral unit I, and a differential unit D. Existing deviation of a proportional reaction system may be adjusted by using a proportional coefficient to reduce an error. Cumulative deviation of the integral reaction system can help the system eliminate a steady-state error, to improve a degree of error-free. Because of an error, integral adjustment is performed until there is no error. A change rate of a deviation signal of a differential reaction system is predictive, and can be used to forecast a change trend of deviation, to produce a control effect in advance. Before formation, the deviation is eliminated based on the differential adjustment effect, thereby improving dynamic performance of the system.

Figure 8:
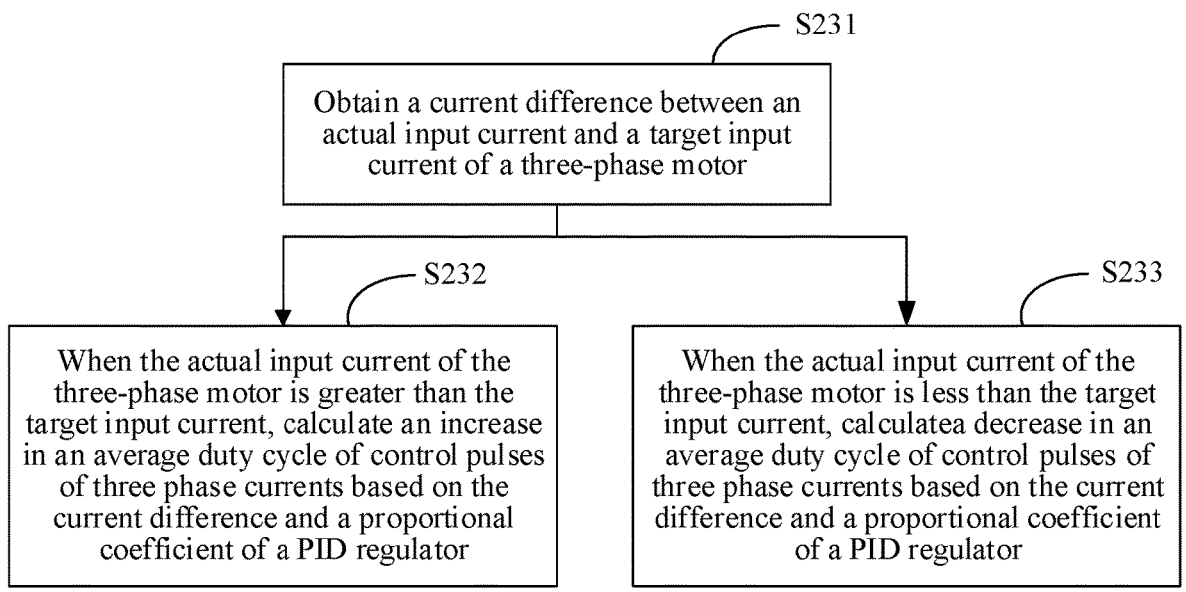
FIG. 8 is a flowchart of step S23 in a method for controlling a motor drive apparatus according to Embodiment 3 of the present disclosure.

In an implementation, as shown in FIG. 8, step S23 includes following steps.

Step S231: Obtain a current difference between the actual input current and the target input current of the three-phase motor.

Step S232: When the actual input current of the three-phase motor is greater than the target input current, calculate an increase in the average duty cycle of the control pulses of the three phase currents based on the current difference and a proportional coefficient of the PID regulator.

Step S233: When the actual input current of the three-phase motor is less than the target input current, calculate a decrease in the average duty cycle of the control pulses of the three phase currents based on a current difference and a proportional coefficient of the PID regulator.

In the foregoing steps, when the actual input current of the three-phase motor is greater than the target input current, an average duty cycle of outputted control pulses of three phase currents is gradually increased to reduce the actual input current of the three-phase motor. When the actual input current of the three-phase motor is less than the target input current, an average duty cycle of outputted control pulses of three phase currents is gradually reduced to increase the actual input current of the three-phase motor.

In the foregoing steps, the actual input current of the three-phase motor is implemented by adjusting the average duty cycle of the control pulses of the three phase currents by the motor controller. Assuming that the target input current of the three-phase motor is I* and the obtained actual input current of the three-phase motor is I, a current difference (I*−I) is inputted into the PID regulator, and the average duty cycle K(I*−I) of the three phase pulses is outputted after being calculated by the PID regulator, where K is a proportional coefficient set in the PID regulator. If the actual input current I of the three-phase motor is less than the target input current I* of the three-phase motor, the average duty cycle of the control pulses of the three phase currents outputted by the PID regulator is decreased, to increase the actual input current I* of the three-phase motor. On the contrary, when the actual input current I of the three-phase motor is greater than the target input current of the three-phase motor, the average duty cycle of the control pulses of the three phase currents outputted by the PID regulator is increased, to decrease the actual input current of the three-phase motor.

Figure 9:
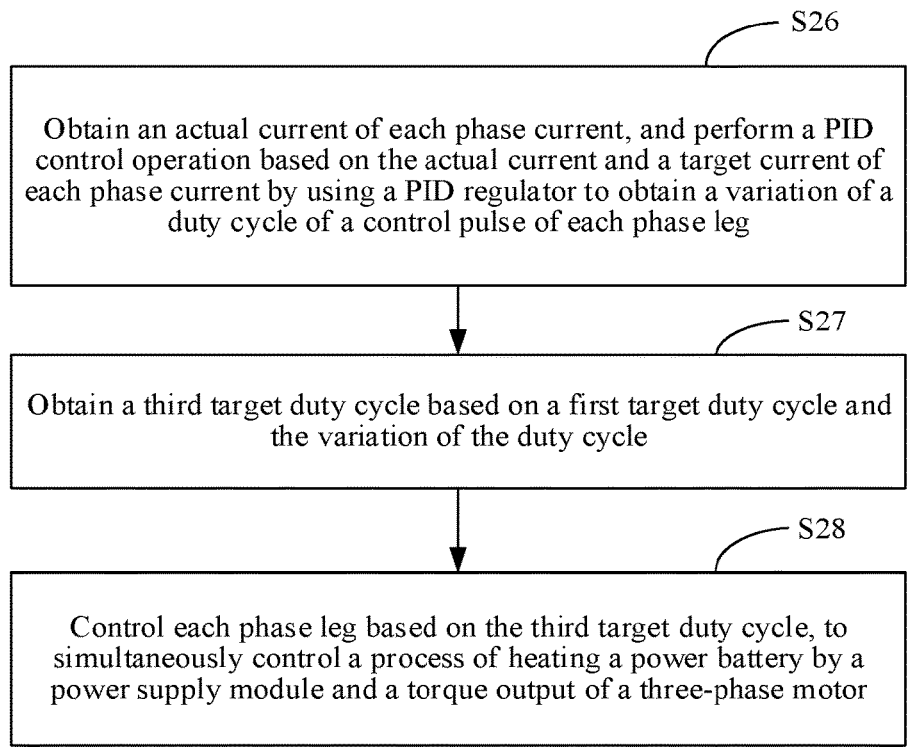
FIG. 9 is another flowchart of steps following step S22 in a method for controlling a motor drive apparatus according to Embodiment 3 of the present disclosure.

Further, as shown in FIG. 9, in step S22, after the controlling each phase leg based on the first target duty cycle, the method further includes following steps.

Step S26: Obtain an actual current of each phase current, and perform a PID control operation based on the actual current and the target current of each phase current by using a PID regulator to obtain a variation of a duty cycle of the control pulse of each phase leg.

Step S27: Obtain a third target duty cycle based on the first target duty cycle and the variation of the duty cycle.

Step S28: Control each phase leg based on the third target duty cycle, to simultaneously control the process of heating the power battery by the power supply module and the torque output of the three-phase motor.

Figure 10:
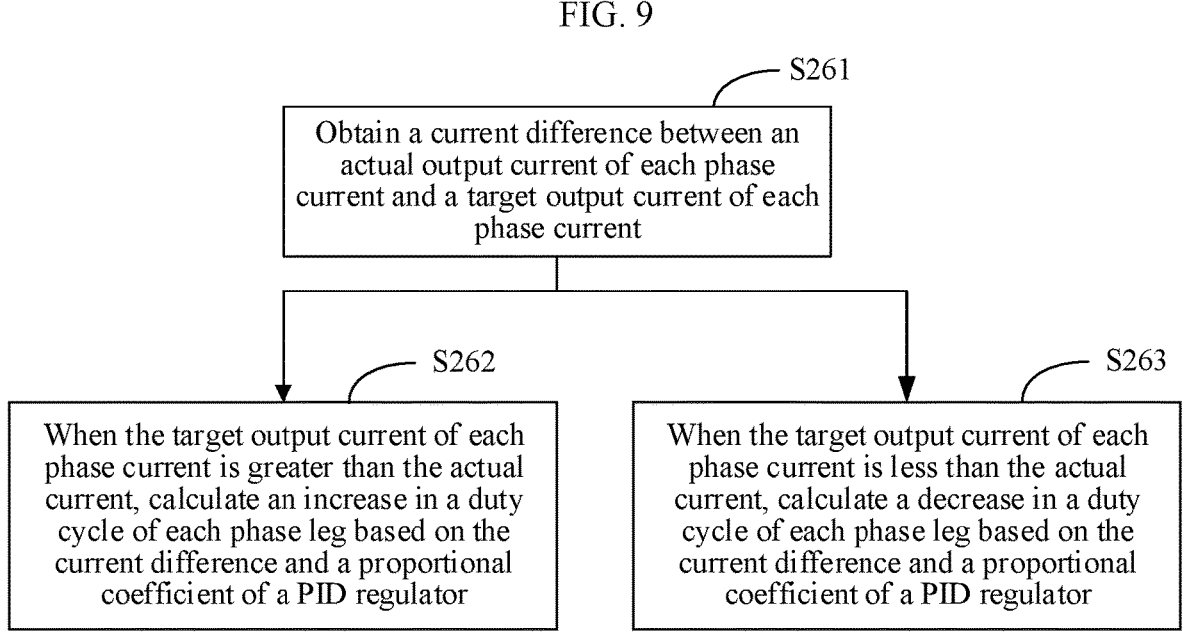
FIG. 10 is a flowchart of step S26 in a method for controlling a motor drive apparatus according to Embodiment 3 of the present disclosure.

As shown in FIG. 10, step S26 includes:

Step S261: Obtain a current difference between the actual current and the target current of each phase current.

Step S262: When the target current of each phase current is greater than the actual current, calculate an increase in the duty cycle of the phase leg based on the current difference and a proportional coefficient of the PID regulator.

Step S263: When the target current of each phase current is less than the actual current, calculate a decrease in the duty cycle of the phase leg based on the current difference and a proportional coefficient of the PID regulator.

In the foregoing steps, when the target current of each phase leg is greater than the actual current, an increase in the outputted duty cycle is gradually increased to increase the actual current of each phase leg. When the target current of each phase leg is less than the actual current, a decrease in the outputted duty cycle is gradually decreased to decrease the actual current of each phase leg.

Current control of the three phase legs is mainly implemented by superimposing increases based on the average duty cycle of the control pulses of the three phase currents. It is assumed that the actual output current of a phase A is Is and a target value is Is*, a current difference (Is−Is*) is inputted into the PID regulator, and an increase value of a duty cycle of pulses of phase A is outputted after being calculated by the PID regulator. If the actual current Is of the phase A is less than the target value Is*, the duty cycle of the phase A outputted by the PID regulator is increased, to increase the output current of the phase A. On the contrary, when the actual current Is of the phase A is greater than the target value Is*, the duty cycle of the phase A outputted by the PID regulator is decreased, to decrease the output current of the phase A. The voltage control of a phase B and a phase C is the same as that of the phase A. Details are not described again.

In this implementation, based on the average duty cycle, a superimposing amount is added to complete the control of the three phase currents, so that actual values of the three phase currents reach the target value of the three phase currents. When an actual charging current of a specific phase is less than the target value, a superimposing amount is increased to a duty cycle of the phase. On the contrary, when the actual charging current is greater than the target value, a superimposing amount is decreased from a duty cycle of the phase. Alternatively, the PID regulator may automatically control actual currents of the three phases to be always close to the target, to simultaneously control the zero torque output, charging, and heating by controlling the three phase currents.

The following further illustrates the embodiments of the present disclosure by using specific examples.

FIG. 2 shows a structure of a motor drive apparatus according to an embodiment of the present disclosure. The motor drive apparatus includes a power battery, a bus capacitor C1, a motor controller, a three-phase motor, an inductor, and switches. The battery is connected to the motor controller by using the direct current bus capacitor C1. The motor controller is connected to the three-phase motor 102 by using three phase wires. The three-phase motor 102 is connected to a switch K1 by using a neutral wire extending from a connection point of three phase coils. The switch K1 is connected to the inductor L, and the inductor L is connected to a charging pile by using a buck side capacitor C2. A negative electrode of the power battery is connected to a switch K2, and the other terminal of the switch K2 is connected to a power supply module. Operating systems using the switches K1 and K2 are divided into a travel driving mode and a parking charging mode. In addition, an electric drive system is connected to a cooling loop of the battery system. When a coolant flows, heat is transferred from the electric drive system to the battery system.

A travel mode of the vehicle is first obtained. When the vehicle is in the travelling driving mode, the switches K1 and K2 are controlled to be disconnected to ensure that the inductor is not energized. The motor controller controls the torque of the motor based on a related torque control algorithm to complete a travel driving function.

When the vehicle is in the parking charging mode, the switches K1 and K2 are controlled to be connected to connect the charging loop including the entire vehicle and the power supply module. The power supply module has two modes of constant voltage charging and constant current charging. Herein, the mode of constant current charging is used for detailed description.

First, based on a heating requirement in a low-temperature condition and a charging requirement of the power battery, a target torque output value, a required heating power, and a required charging power of the battery are obtained.

The motor drive apparatus interacts with the power supply module. A battery manager sends a buck instruction to the motor controller. The motor controller uses the three-phase duty cycle for control, to charge the buck side capacitor C2 to a voltage U, and the charging pile starts charging after detecting U. In addition, the battery manager obtains a voltage of the buck side capacitor and an output current of the power supply module based on a charging capacity of the battery manager, and sends a target output current to the charging pile, and the charging pile outputs based on the target charging current.

Then, based on requirements of the zero torque output, a heating power, and a charging power, a target value of three phase currents is calculated, and a calculation formula is as follows:

$$T_e = \frac{3}{2} * \rho * [\lambda + (L_d - L_q) *$$
$$\frac{2}{3} * [\sin\alpha * IA + \sin(\alpha - 120) * IB + \sin(\alpha + 120) * IC]] *$$
$$\frac{2}{3} * (\cos\alpha * IA + \cos(\alpha - 120) * IB + \cos(\alpha + 120) * IC)$$

$$IA + IB + IC = I$$

$$P = (IA \times IA + IB \times IB + IC \times IC) \times R1$$

where α is a lag angle of a rotor, IA, IB, and IC are respectively phase currents of the three phase coils, I is an input current of the three-phase motor, which meets the power requirements for three aspects of driving, battery charging and heating, Te is an output of the motor at a zero torque, $\lambda$, $\rho$, $L_d$, $L_q$ are motor parameters, and P is the heating power.

Figure 11:
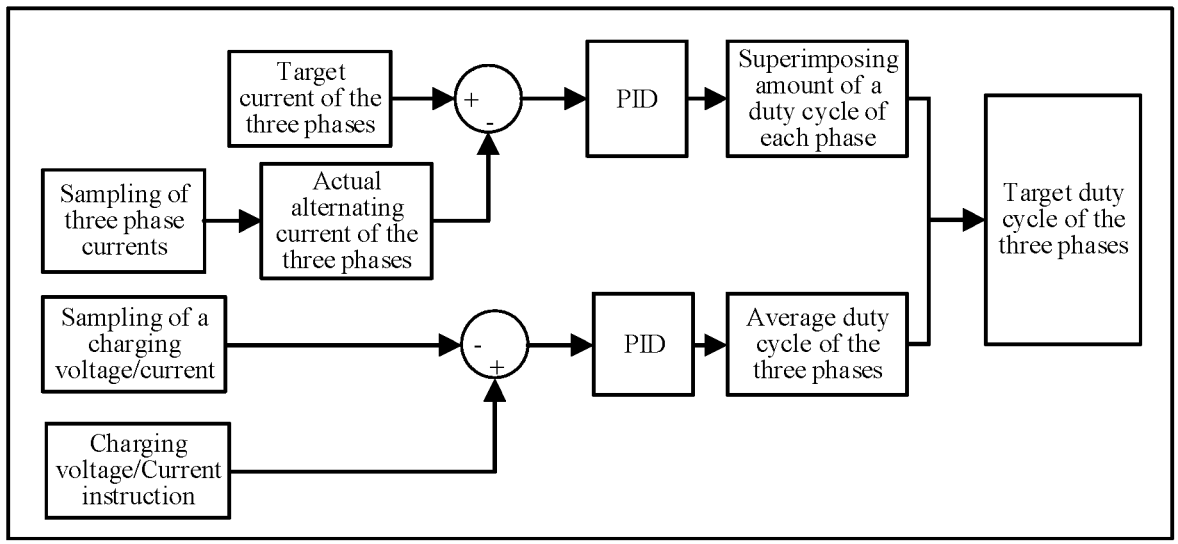
FIG. 11 is a block diagram of a control structure of a method for controlling a motor drive apparatus according to Embodiment 3 of the present disclosure.
Figure 12:
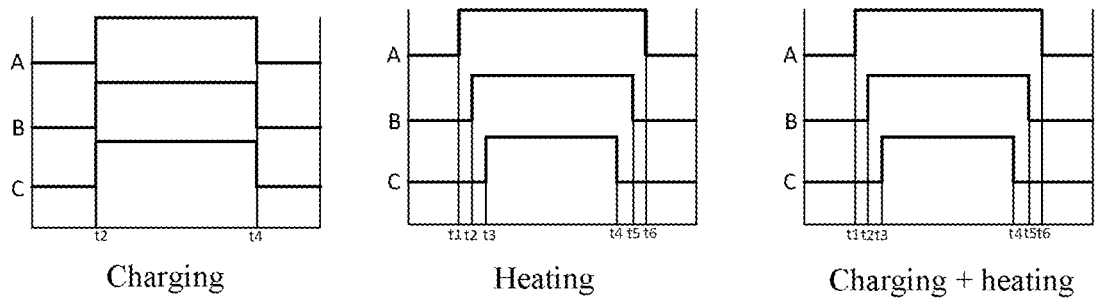
FIG. 12 is a schematic diagram of control pulses of three phases in a method for controlling a motor drive apparatus according to Embodiment 3 of the present disclosure.

Three phase currents IA, IB, and IC, and an actual input current I of the three-phase motor are sampled, and then an actual voltage and a heating power of the buck side capacitor are separately controlled by using their respective PID control loops. A target input current I* of the three-phase motor is sent by the battery system to the motor controller. After the motor controller compares the actual input current with the target input current, the average target value of the duty cycle of the three phases is outputted under the control of the PID regulator, to control the actual input current. If the actual input current is greater than the target input current, the average duty cycle of the three phases is increased after PID control, to decrease the actual input current. On the contrary, if the actual input current is less than the target input current, the average duty cycle of the three phases is decreased after PID control, to increase the actual input current. In addition, the actual three phase currents IA, IB, and IC are compared with target currents IA*, IB*, and IC*, and the duty cycle of the three phases is adjusted by using their respective PID control. The greater the duty cycle is adjusted to be, the larger the current of the phase flowing into the motor is, and the smaller the duty cycle is adjusted to be, the smaller the current flowing out of the motor is. As shown in FIG. 11 and FIG. 12, a PID control loop is used for the heating power, to control the current between the three phases, and another PID control loop is used for the charging current or the charging voltage to control the charging current or voltage. Simultaneous, independent, and continuous control is implemented for the charging voltage and the heating power by controlling of two PIDs, and closed-loop control is implemented. The coordinated control of the charging power and the heating power is implemented under the condition of the zero torque output, thereby meeting the battery's dual requirements for the charging power and the heating power in the low-temperature condition.

Figure 13:
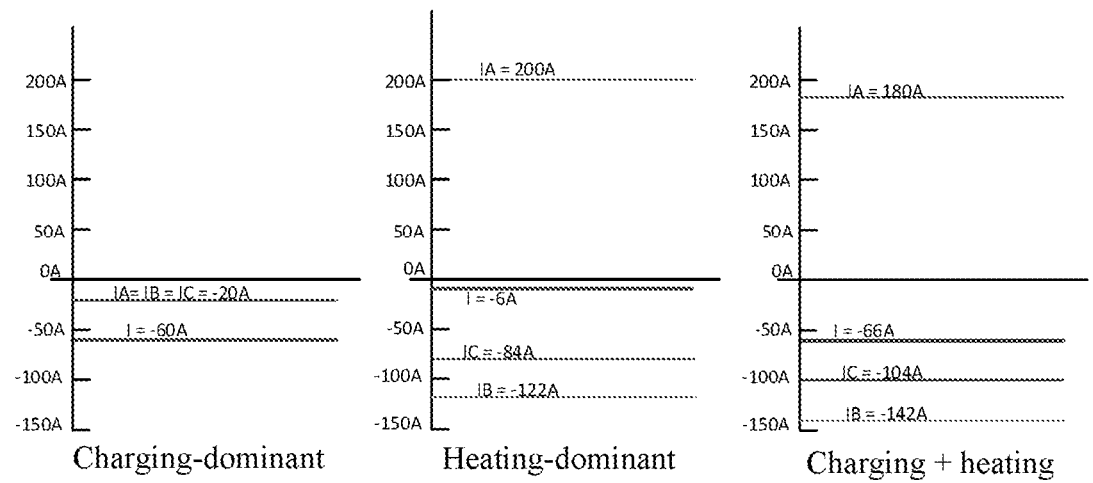
FIG. 13 is a schematic diagram of current allocation in a method for controlling a motor drive apparatus according to Embodiment 3 of the present disclosure.

During charging in the low-temperature condition, there are three stages for the charging, heating, and torque output control of the power battery in the motor drive apparatus:

A first one is a heating-dominant charging stage. In this stage, because the temperature of the power battery is low, the charging capacity is weak, a charging current is small, and in this case, the heating power is controlled to be the maximum, to implement high-power heating under a condition of low-current charging of the power battery, thereby increasing the battery temperature as quickly as possible. This stage is heating-dominant. Current allocation is shown in a middle image in FIG. 13. After the charging pile outputs a current I to the bus capacitor C1, electricity on the capacitor is consumed through heating control. After cancellation thereof, the charging current of the power battery is very small. Therefore, the current in the inductor is very small, but the current flowing through the three-phase motor and the motor controller is large. Real-time temperature detection and protection are required to ensure that the heating power of the battery is the maximum without damaging the device.

Then, as the temperature of the power battery rises, the charging capability of the power battery continuously increases, and the charging current continuously increases. In this case, a large heating power is also ensured, the temperature of the power battery also continuously rises, and because of the large charging current, some heat is generated inside the power battery. Current allocation is shown in a right image in FIG. 13. A current I outputted by the charging pile to the bus capacitor C1 is large, and a current used for heating control to consume electricity on the capacitor is small. After cancellation thereof, the charging current of the battery is large. Therefore, currents flowing through the inductor, the three-phase motor, and the motor controller are large. Real-time temperature detection and protection are required to ensure optimal coordination of the charging and heating power of the battery without damaging the device.

Finally, after the battery temperature becomes high, high-power direct current charging may be performed. A large amount of heat is generated inside the battery, which facilitates maintenance of the battery temperature. Therefore, a requirement for a heating power is decreased. In this stage, charging is mainly performed. Current allocation is shown in a left image in FIG. 13. A current outputted by the charging pile to the bus capacitor C1 is large, and a current used for heating control to consume electricity on the capacitor is very small. After cancellation thereof, the charging current is large. Therefore, the current flowing through the inductor is large. Real-time temperature detection and protection are required to ensure that the charging power of the battery is the maximum without damaging the device.

In each charging process, the motor rotor remains at a specific location, and the three phase currents calculated based on the torque control algorithm and a heating power also remain unchanged, and the three phases are unbalanced. However, a life cycle of the entire vehicle is usually several years, the motor rotor randomly appears at a specific location, values of the three phase currents are also random, each phase current has the same probability of being large or small, and therefore, from the perspective of the entire life cycle, the three phases are balanced, and there is no problem of accelerated aging of a specific phase because of overuse.

In addition, the charging current is shared by the three phases, and power capacities of the motor and the motor controller may be fully utilized. After the inductor is separately optimized, greater power charging can be implemented.

In this embodiment of the present disclosure, the coordinated control method of the torque output, charging of the power battery, and heating of the power battery is mainly implemented by adjusting the duty cycle of the control pulses of the six power switch tube in the motor controller. First, an average value of duty cycles of the three phases is controlled, to control the charging current or the charging voltage, and the difference between the duty cycles of the three phases is used to control the current between the three phases which flows among the three phases. For example, the current flows from the phase A into the motor, and then flows out of phases B and C of the motor, and the three phase currents are used to control the torque and the heating power of the motor. As shown in FIG. 12, examples of allocation of duty cycles of the three phases for charging, heating, and simultaneous control of charging and heating are shown from left to right in sequence. Closed-loop control is implemented, to implement coordinated control of the charging power and the heating power under the condition of the zero torque output, thereby meeting the battery's dual requirements for the charging power and the heating power in the low-temperature condition.

In the technical solutions of the present disclosure, based on the original electric drive system, the torque output of the motor is implemented in the coordinated control method of the torque output, charging of the power battery, and heating of the power battery, to ensure safety of the torque of the entire vehicle during charging and meet heating and charging requirements of the power battery in the low-temperature condition.

Figure 14:
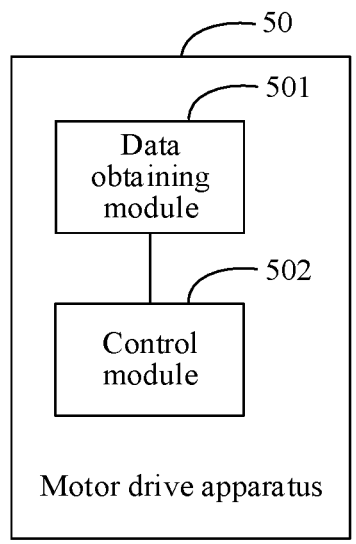
FIG. 14 is a schematic structural diagram of a motor drive apparatus according to Embodiment 4 of the present disclosure.

Embodiment 4 of the present disclosure provides a motor drive apparatus 50. As shown in FIG. 14, based on the motor drive apparatus according to Embodiment 1, the motor drive apparatus further includes:
 a data obtaining module 501, configured to obtain a required heating power and a required charging power; and
 a control module 502, configured to adjust a current value and direction of each phase current of the three-phase motor based on the required heating power, the required charging power, and an output of the motor at a zero torque, to simultaneously control a process of charging the power battery by the power supply module, the torque of the three-phase motor at a zero output, and the three-phase inverter and the three-phase motor to heat a heat exchange medium flowing through at least one of the three-phase inverter or the three-phase motor.

Figure 15:
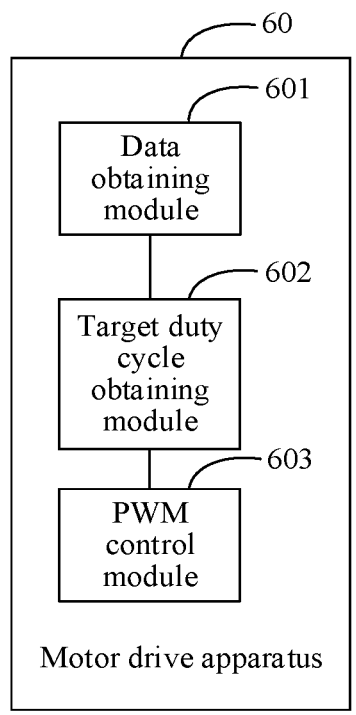
FIG. 15 is a schematic structural diagram of a motor drive apparatus according to Embodiment 5 of the present disclosure.

Embodiment 5 of the present disclosure provides a motor drive apparatus 60. As shown in FIG. 15, based on the motor drive apparatus according to Embodiment 1, the motor drive apparatus further includes:
 a data obtaining module 601, configured to obtain a required heating power and a required charging power;
 a target duty cycle obtaining module 602, configured to obtain a target input current of the three-phase motor and a first target duty cycle of a control pulse of each phase leg based on the required heating power, the required charging power, and an output of the motor at a zero torque; and
 a pulse width modulation (PWM) control module 603, configured to receive an input current of the power supply module based on the target input current, and control each phase leg based on the first target duty cycle, to simultaneously control a process of charging the power battery by the power supply module, the torque of the three-phase motor at a zero output, and the three-phase inverter and the three-phase motor to heat a heat exchange medium flowing through at least one of the three-phase inverter or the three-phase motor.

Another embodiment of the present disclosure provides a vehicle, including a memory and a processor, and
 the processor is configured to read an executable program code stored in the memory to run a program corresponding to the executable program code, to implement the control method according to Embodiment 2 and Embodiment 3.

Another embodiment of the present disclosure provides a non-transitory computer-readable storage medium, storing a computer program thereon, where when the program is executed by a processor, the control method according to Embodiment 2 and Embodiment 3.

The foregoing embodiments merely describe the technical solutions of the present disclosure, but do not limit the present disclosure. Although the present disclosure is described in detail with reference to the foregoing embodiments, a person of ordinary skill in the art should understand that they may still make modifications to the technical solutions recorded in the foregoing embodiments or make equivalent replacements to some technical features thereof, without departing from the spirit and scope of the technical solutions of the embodiments of the present disclosure, which being included in the protection scope of the present disclosure.

What is claimed is:
1. A motor drive apparatus, comprising: a three-phase inverter and a three-phase motor,

17 wherein a first terminal of the three-phase inverter is connected to a positive electrode of a power battery, a second terminal of the three-phase inverter is connected to a negative electrode of the power battery, and three phase coils of the three-phase motor are respectively connected to midpoints of three phase legs of the three-phase inverter, wherein the motor drive apparatus is configured to simultaneously control (i) a process of charging the power battery by a power supply module, (ii) a torque of the three-phase motor at a zero output, and (iii) the three-phase inverter and the three-phase motor to heat a heat exchange medium flowing through at least one of the three-phase inverter or the three-phase motor.

2. The motor drive apparatus according to claim 1, further comprising a capacitor, wherein a first terminal of the capacitor is connected to the positive electrode of the power battery, a second terminal of the capacitor is connected to the negative electrode of the power battery, and the power battery is connected to a controller by the capacitor.

3. The motor drive apparatus according to claim 1, further comprising an inductor and a buck side capacitor, wherein the inductor is connected between three phase coils of the three-phase motor and a first terminal of the buck side capacitor.

4. The motor drive apparatus according to claim 1, wherein the motor drive apparatus is further configured to perform operations comprising:
obtaining a required heating power and a required charging power; and
adjusting a current value and direction of each phase current of the three-phase motor based on the required heating power, the required charging power, and an output of the three-phase motor at a zero torque.

5. The motor drive apparatus according to claim 3, wherein the motor drive apparatus is further configured to perform operations comprising:
obtaining a required heating power and a required charging power;
obtaining a target input current of the three-phase motor and a first target duty cycle of a control pulse of each phase leg based on the required heating power, the required charging power, and an output of the three-phase motor at a zero torque; and
receiving an input current of the power supply module based on the target input current, and controlling each phase leg based on the first target duty cycle.

6. The motor drive apparatus according to claim 5, wherein the obtaining a target input current of the three-phase motor and a first target duty cycle of a control pulse of each phase leg based on the required heating power, the required charging power, and an output of the three-phase motor at a zero torque comprises:
obtaining a target voltage of the buck side capacitor; and
calculating the target input current of the three-phase motor based on the required heating power, the required charging power, the output of the three-phase motor at a zero torque, and the target voltage.

7. The motor drive apparatus according to claim 6, wherein the obtaining a target input current of the three-phase motor and a first target duty cycle of a control pulse of each phase leg based on the required heating power, the required charging power, and an output of the three-phase motor at a zero torque further comprises:
obtaining a target current of each phase current of the three-phase motor based on a location of a motor rotor,

18 the required heating power, the target input current, and the output of the three-phase motor at a zero torque; and
obtaining the first target duty cycle of the control pulse of each phase leg based on the target current of each phase current, the target input current, the target voltage of the buck side capacitor, and a voltage of the power battery.

8. The motor drive apparatus according to claim 7, wherein the obtaining a target current of each phase current based on a location of a motor rotor, the required heating power, the target input current, and the output of the three-phase motor at a zero torque comprises:
calculating a target current of each phase current of the three-phase motor based on the required heating power, the location of the motor rotor, and the output of the three-phase motor at a zero torque by using formula 1, formula 2, and formula 3:

$$T_e = \frac{3}{2} * \rho * \left[\lambda + (L_d - L_q) * \frac{2}{3} * \right.$$
$$[\sin\alpha * IA + \sin(\alpha - 120) * IB + \sin(\alpha + 120) * IC]] *$$
$$\left. \frac{2}{3} * (\cos\alpha * IA + \cos(\alpha - 120) * IB + \cos(\alpha + 120) * IC), \right.$$

$$IA + IB + IC = I, \qquad \text{formula 2}$$

$$P = (IA \times IA + IB \times IB + IC \times IC) \times R, \qquad \text{formula 3}$$

wherein $\alpha$ is a lag angle of a rotor, IA, IB, and IC are respectively phase currents of the three phase coils, I is the target input current, Te is the output of the three-phase motor at a zero torque, $\lambda$, $\rho$, $L_d$, $L_q$ are motor parameters, P is heating power, and R is an equivalent impedance of the three-phase motor.

9. The motor drive apparatus according to claim 7, wherein the obtaining the first target duty cycle of the control pulse of each phase leg based on the target current of each phase current, the target input current, the target voltage of the buck side capacitor, and a voltage of the power battery comprises:
obtaining an average duty cycle of control pulses of three phase currents based on the target voltage of the buck side capacitor, the target input current, and the voltage of the power battery; and
obtaining the first target duty cycle of the control pulse of each phase leg based on the average duty cycle, the target input current, the target current of each phase current, and the voltage of the power battery.

10. The motor drive apparatus according to claim 9, wherein the obtaining an average duty cycle of control pulses of three phase currents of the three-phase motor based on the target voltage of the buck side capacitor, the target input current, and the voltage of the power battery comprises:
obtaining the average duty cycle of the three phase currents based on the target voltage of the buck side capacitor, the target input current, and the voltage of the power battery by using a formula:

$$U_2 = U_1 \times D_0 - I \times R,$$

wherein $U_2$ is the target voltage of the buck side capacitor, $U_1$ is the voltage of the power battery, $D_0$ is the average duty cycle of the control pulses of the three phase currents, I is the target input current, and R is an equivalent impedance of the three-phase motor; and obtaining the first target duty cycle of the control pulse of each phase leg based on the average duty cycle, the target input current, the target current of each phase current, and the voltage of the power battery by using the following formula:

$$D_1 = D_0 - \frac{IR - I_1 \times R_1}{U_1},$$

wherein $I_1$ is the target current of each phase current, $R_1$ is an equivalent impedance of each phase coil, and $D_1$ is the first target duty cycle of the control pulse of each phase leg.

11. The motor drive apparatus according to claim 5, wherein after the controlling each phase leg based on the first target duty cycle, the operations further comprise:
obtaining an actual input current of the three-phase motor, and performing a proportional-integral-derivative (PID) control operation based on the actual input current and the target input current of the three-phase motor by using a PID regulator to obtain a variation of an average duty cycle of control pulses of three phase currents of the three-phase motor;
obtaining a second target duty cycle based on the first target duty cycle and the variation of the average duty cycle; and
controlling each phase leg based on the second target duty cycle, to simultaneously control the process of charging the power battery by the power supply module, the torque of the three-phase motor at a zero output, and the three-phase inverter and the three-phase motor to heat a heat exchange medium flowing through at least one of the three-phase inverter or the three-phase motor.

12. The motor drive apparatus according to claim 11, wherein the obtaining an actual input current of the three-phase motor, and performing a PID control operation based on the actual input current and the target input current of the three-phase motor by using a PID regulator to obtain a variation of the average duty cycle of the control pulses of the three phase currents comprises:
obtaining a current difference between the actual input current and the target input current of the three-phase motor; and
when the actual input current of the three-phase motor is greater than the target input current, calculating an increase in the average duty cycle of the control pulses of the three phase currents based on the current difference and a proportional coefficient of the PID regulator; or
when the actual input current of the three-phase motor is less than the target input current, calculating a decrease in the average duty cycle of the control pulses of the three phase currents based on a current difference and a proportional coefficient of the PID regulator.

13. The motor drive apparatus according to claim 5, wherein after the controlling each phase leg based on the first target duty cycle, the operations further comprise:
obtaining an actual current of each phase current of the three-phase motor, and performing a PID control operation based on the actual current and a target current of each phase current by using a PID regulator to obtain a variation of a duty cycle of the control pulse of each phase leg;

obtaining a third target duty cycle based on the first target duty cycle and the variation of the duty cycle; and
controlling each phase leg based on the third target duty cycle, to simultaneously control the process of charging the power battery by the power supply module, the torque of the three-phase motor at a zero output, and the three-phase inverter and the three-phase motor to heat the heat exchange medium flowing through at least one of the three-phase inverter or the three-phase motor.

14. The motor drive apparatus according to claim 13, wherein the performing a PID control operation based on the actual current and the target current of each phase current by using a PID regulator to obtain a variation of a duty cycle of the control pulse of each phase leg comprises:
obtaining a current difference between the actual current and the target current of each phase current;
when the target current of each phase current is greater than the actual current, calculating an increase in the duty cycle of the phase leg based on the current difference and a proportional coefficient of the PID regulator; or
when the target current of each phase current is less than the actual current, calculating a decrease in the duty cycle of the phase leg based on the current difference and a proportional coefficient of the PID regulator.

15. A vehicle comprising a memory storing an executable program code and a processor, wherein the processor is configured to execute the executable program code to perform operations comprising:
obtaining a required heating power and a required charging power of the vehicle; and
adjusting a current value and direction of each phase current of a three-phase motor based on the required heating power, the required charging power, and an output of the three-phase motor at a zero torque, to simultaneously control (i) a process of charging a power battery by a power supply module, (ii) a torque of the three-phase motor at a zero output, and (iii) a three-phase inverter and the three-phase motor to heat a heat exchange medium flowing through at least one of the three-phase inverter or the three-phase motor.

16. The vehicle according to claim 15, wherein the operations further comprise:
obtaining a required heating power and a required charging power; and
adjusting a current value and direction of each phase current of the three-phase motor based on the required heating power, the required charging power, and an output of the three-phase motor at a zero torque.

17. The vehicle according to claim 15, wherein the operations further comprise:
obtaining a required heating power and a required charging power;
obtaining a target input current of the three-phase motor and a first target duty cycle of a control pulse of each phase leg based on the required heating power, the required charging power, and an output of the three-phase motor at a zero torque; and
receiving an input current of the power supply module based on the target input current, and controlling each phase leg based on the first target duty cycle.

18. The vehicle according to claim 17, wherein the obtaining a target input current of the three-phase motor and a first target duty cycle of a control pulse of each phase leg based on the required heating power, the required charging power, and an output of the three-phase motor at a zero torque comprises:

obtaining a target voltage of a buck side capacitor; and calculating the target input current of the three-phase motor based on the required heating power, the required charging power, the output of the three-phase motor at a zero torque, and the target voltage.

19. The vehicle according to claim 18, wherein the obtaining a target input current of the three-phase motor and a first target duty cycle of a control pulse of each phase leg based on the required heating power, the required charging power, and an output of the three-phase motor at a zero torque further comprises:

obtaining a target current of each phase current of the three-phase motor based on a location of a motor rotor, the required heating power, the target input current, and the output of the three-phase motor at a zero torque; and obtaining the first target duty cycle of the control pulse of each phase leg based on the target current of each phase current, the target input current, the target voltage of the buck side capacitor, and a voltage of the power battery.

20. A method comprising:

obtaining a required heating power and a required charging power of a vehicle; and adjusting a current value and direction of each phase current of a three-phase motor based on the required heating power, the required charging power, and an output of the three-phase motor at a zero torque, to simultaneously control (i) a process of charging a power battery by a power supply module, (ii) a torque of the three-phase motor at a zero output, and (iii) a three-phase inverter and the three-phase motor to heat a heat exchange medium flowing through at least one of the three-phase inverter or the three-phase motor.

* * * * *

UNITED STATES PATENT AND TRADEMARK OFFICE
CERTIFICATE OF CORRECTION

PATENT NO. : 12,218,613 B2
APPLICATION NO. : 18/606204
DATED : February 4, 2025
INVENTOR(S) : Yubo Lian et al.

Page 1 of 1

It is certified that error appears in the above-identified patent and that said Letters Patent is hereby corrected as shown below:

In the Specification

In Column 8, Line 65, "where a is a lag angle" should read – where α is a lag angle –

Signed and Sealed this
First Day of July, 2025

Coke Morgan Stewart
*Acting Director of the United States Patent and Trademark Office*